United States Patent [19]
Sebilet

[11] Patent Number: 5,235,616
[45] Date of Patent: Aug. 10, 1993

[54] BIDIRECTIONAL DATA TRANSMISSION SYSTEM

[75] Inventor: Bruno R. Sebilet, Rueil Malmaison, France

[73] Assignee: Societe Nationale D'Etude et de Construction de Moteurs D'Aviation "S.N.E.C.M.A.", Paris, France

[21] Appl. No.: 943,672

[22] Filed: Sep. 11, 1992

[30] Foreign Application Priority Data

Sep. 11, 1991 [FR] France .................................. 9111194

[51] Int. Cl.$^5$ ............................................. H04L 27/30
[52] U.S. Cl. .......................................... 375/1; 380/34; 380/35
[58] Field of Search ................... 375/1, 23; 380/34, 35

[56] References Cited

U.S. PATENT DOCUMENTS 4,324,002  4/1982  Spilker, Jr. .............................. 380/34
5,010,557  4/1991  Chun ........................................ 375/1

FOREIGN PATENT DOCUMENTS 0284493  9/1988  European Pat. Off. .

Primary Examiner—Bernarr E. Gregory
Attorney, Agent, or Firm—Oblon, Spivak, McClelland, Maier & Neustadt

[57] ABSTRACT

A bidirectional data transmission system using the technique known as spectrum spreading by direct sequence comprises a first transmitter-receiver assembly consisting of a first transmitter section which generates a coded first data signal for transmission by modulation of a radioelectrical carrier by a spreading code of which the delay is modulated under the control of the first data, and a first receiver section which receives a coded second data signal and restores the second data therefrom, and a second transmitter-receiver assembly consisting of a second transmitter section which generates the coded second data signal for transmission by modulation of a transmission carrier by a spreading code, the carrier itself being modulated by the second data, and a second receiver section which receives the coded first data signal and restores the first data therefrom by demodulation of the delay in the spreading code contained in the coded first data signal, the restored first data being used to control the delay of the spreading code generated for the second transmitter section.

9 Claims, 4 Drawing Sheets

BIDIRECTIONAL DATA TRANSMISSION SYSTEM

BACKGROUND OF THE INVENTION

1. Field of the Invention

The invention relates to a bidirectional transmission system for the bidirectional wireless transmission of spectrum spread data between any two points.

2. Summary of the Prior Art

When discreet, confidential and jamming resistant transmission of data is required, it is known to make use of the techniques referred to as wide band spectrum spreading. In the case of the direct sequence spreading technique, the useful signal to be transmitted modulates a spreading code in the form of a pseudo-random sequence of binary values, the rate of which is far higher than the band width of the useful signal. On reception, the received coded signal is correlated with a pseudo-random code generated by the receiver of which the setting makes it possible, by means of a synchronizing device, to restore the initial useful signal.

However, this confidential data transmission is unidirectional and therefore, if a two way transmission is desired, it is necessary to make use of two separate identical links.

SUMMARY OF THE INVENTION

It is thus an object of the invention to provide for bi-directional data transmission via a single link which is particularly simple in its construction and which retains the many advantages of using the spectrum spreading technique by direct sequence.

According to the invention, this aim is achieved by providing a bidirectional data transmission system for transmitting first and second data signals using the technique known as spectrum spreading by direct sequence, comprising first and second transmitter-receiver assemblies, said first transmitter-receiver assembly comprising a first transmitter section including an input for said first data, a first code generator for producing a spreading code having a delay modulated under the control of said first data, means for producing a radioelectrical carrier, and a first modulator for modulating said carrier by said spreading code to provide a coded first data signal for transmission, and a first receiver section for receiving a coded second data signal transmitted from said second transmitter-receiver assembly and restoring said second data from said received coded second data signal, said first receiver section including a mixer for mixing said received coded second data signal with said coded first data signal, and means for demodulating the output from said mixer to provide said restored second data, and said second transmitter-receiver assembly comprising a second transmitter section including an input for said second data, means for producing a transmission carrier modulated by said second data, a second code generator for producing a spreading code having a delay, said second code generator also producing an alternating signal, and a second modulator for modulating said transmission carrier by said spreading code produced by said second code generator to provide said coded second data signal for transmission, and a second receiver section for receiving said coded first data signal transmitted from said first transmitter-receiver assembly and restoring said first data by demodulation of the spreading code delay contained in said coded first data signal, said second receiver section including means for correlating the received coded first data signal with said coded second data signal, and a synchronous detector which receives the output from said correlating means and also said alternating signal to provide said restored first data, said restored first data being used to control said delay of said spreading code produced by said second code generator.

The delay modulation of the spreading code produced by the first transmitter-receiver assembly may be effected by modification of the frequency of a voltage controlled oscillator under the control of the first data, or by modification of the delay of the code delivered by the first code generator under the control of the first data.

Preferably the spreading code of period T produced by the first transmitter-receiver assembly is composed of two alternately used pseudo-random binary semi-sequences of period T/2 and having nil or virtually nil intercorrelation, and the spreading code of the second transmitter receiver assembly is composed of the same half sequences, one of which is affected by an offset corresponding to a circular rotation.

In a first embodiment, the radioelectrical carrier of the first transmitter-receiver assembly is produced by a fixed frequency local oscillator, and the transmission carrier of the second transmitter-receiver assembly is produced by an oscillator the frequency of which can be modified under the control of the second data.

In a second embodiment, the radioelectrical carrier of the first transmitter receiver assembly is produced by a first frequency synthesizer from a voltage controlled oscillator controlled by the first data, and the transmission carrier of the second transmitter-receiver assembly is produced by a second frequency synthesizer from a voltage controlled oscillator controlled by said restored first data, said second frequency synthesizer also receiving said second data as a modulating input.

Preferably, the first and second modulators are of the type having two phase states, for example O-$\pi$.

Further features and advantages of the invention will become apparent from the following description of the preferred embodiments, given by way of example, with reference to the appended drawings.

DESCRIPTION OF THE PREFERRED EMBODIMENTS

Figure 1:
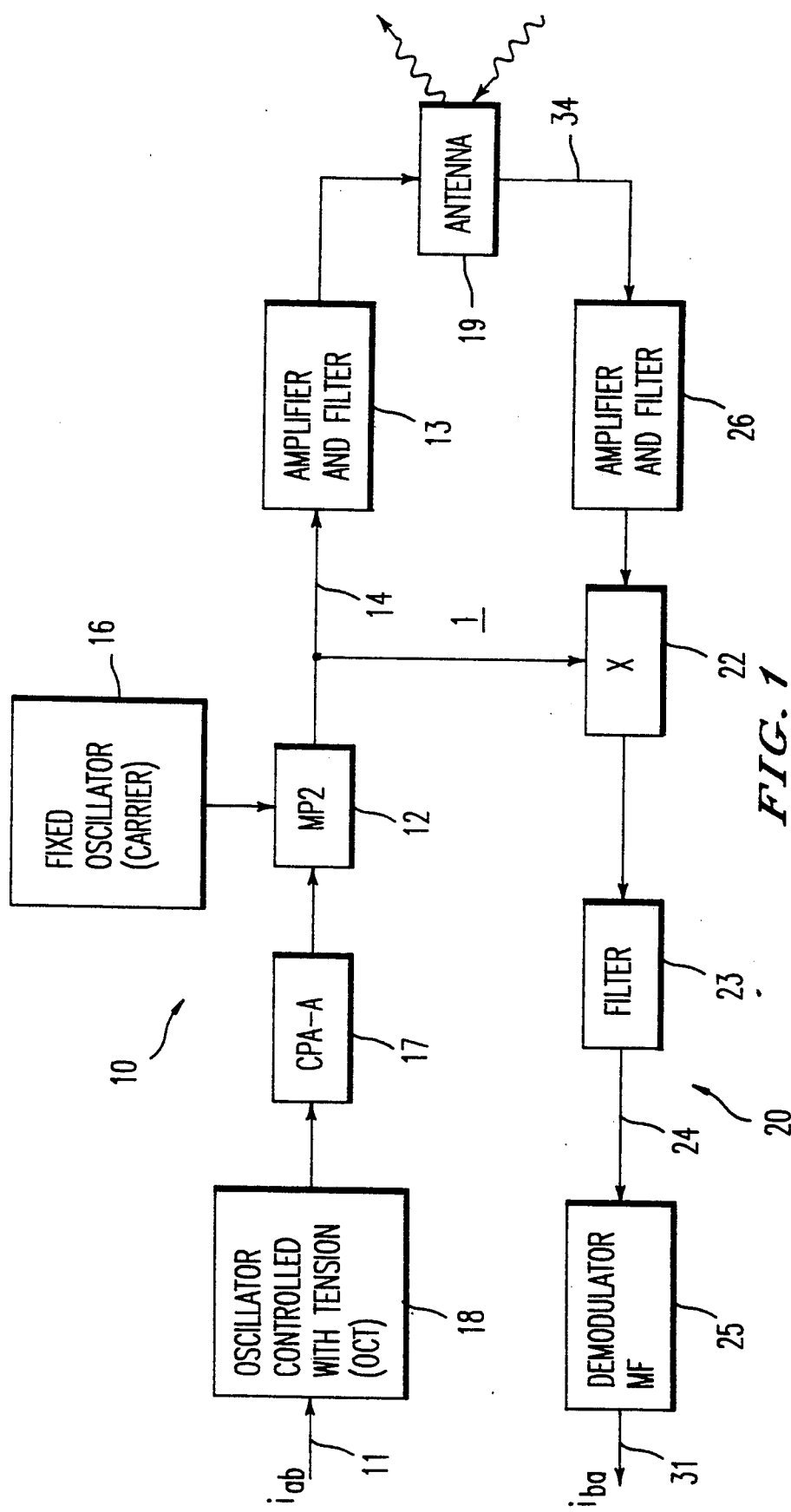
FIG. 1 is a block diagram of a first transmitter-receiver assembly of a first embodiment of the system in accordance with the invention.

The transmission systems which are represented in the drawings comprise at least one first transmitter-receiver assembly situated at any point, and at least one second transmitter-receiver assembly situated at any other point separate from the first. These two assemblies enable a wireless connection to be made between the two points, which will be hereinafter designated A and B. Jointly present in each assembly are a transmitter and a receiver which function simultaneously.

FIG. 1 shows the first transmitter-receiver assembly 1, situated for example at point A, of the first embodiment, the assembly comprising a first transmitter section 10 which receives first data 11 to be transmitted to the point B, and a first receiver section 20 which restores second data 31 from the coded second data signal 34 received from a second transmitter-receiver assembly 2 situated at point B.

The first transmitter section 10 comprises a first modulator 12, which is preferably of the type having two phase states (MP2) although any other phase or frequency modulation arrangement may be used. The modulator 12, generates a coded first data signal 14 by modulation of a radioelectrical carrier 15, emanating from a fixed frequency local oscillator 16, using a spreading code Produced by a first code generator 17 controlled by a voltage controlled oscillator 18 which is itself controlled by the input first data 11. The coded first data signal 14 is amplified and filtered 13 before being transmitted to point B via an antenna 19.

The first receiver section 20 comprises a mixer 22 which recieves the coded first data signal 14 and also the received coded second data signal 34, and which delivers, via filter 23, a carrier 24 modulated by the second data 31 to a simple frequency demodulator 25 by which the second data 31 is restored. An amplifier and filter unit 26 may advantageously be positioned between the antenna 19 and the mixer 22 to facilitate processing of the coded second data signal 34 received by the first transmitter-receiver assembly 1.

Figure 2:
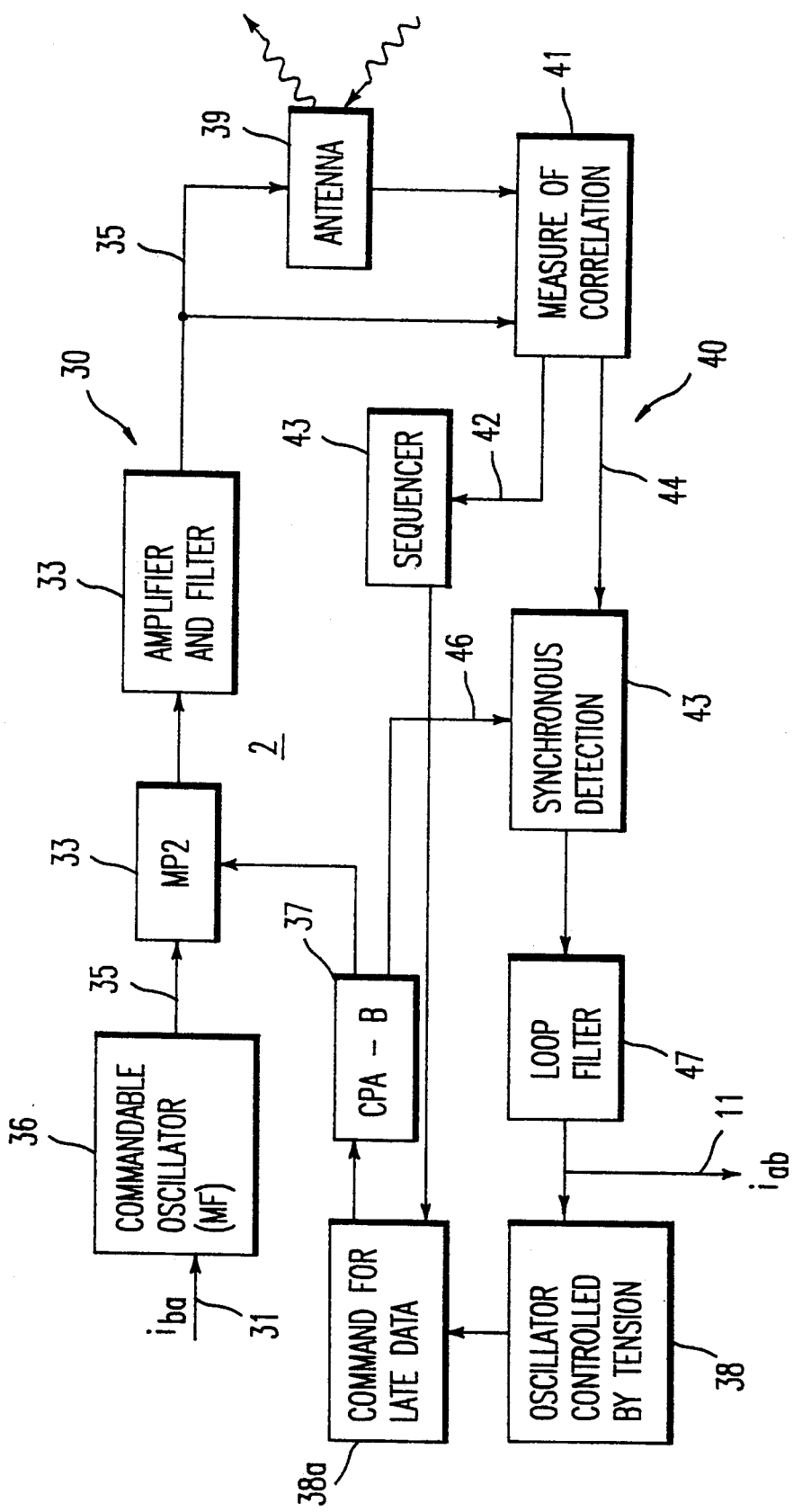
FIG. 2 is a block diagram of a second transmitter-receiver assembly of the first embodiment.

FIG. 2 shows the second transmitter-receiver assembly 2 situated at point B, the assembly comprising a second transmitter section 30 which receives the second data 31 which is to be transmitted to point A, and a second receiver section 40 which restores the first data 11 from the coded first data signal 14 received from the first transmitter-receiver assembly 1 situated at point A.

The second transmitter section 30 comprises a second modulator 32, preferably (but not necessarily) of the type having two Phase states (MP2), which generates the coded second data signal 34 for transmission by an antenna 39, preferably after amplification and filtering at 33. The coded second data signal 34 is generated by modulation of a carrier 35 produced by an oscillator 36 of which the frequency is modified under the control of the second data 31 to be transmitted, the modulation being determined by a spreading code produced by a second code generator 37 controlled by a voltage controlled oscillator 38 via a delay control module 38a.

The second receiver section 40 comprises a correlator 41 which compares the coded first data signal 14 received from the first transmitter-receiver assembly 1 with the coded second data signal 34 and delivers a first signal 42 to a sequencer 43 and a second signal 44 to a synchronous detection circuit 45 which also receives an alternating signal 46 supplied by the second code generator 37. The synchronous detector 45, a multiplier circuit, delivers the restored first data signal 11 via a filter 47.

In the A to B direction, transmission is effected from the first transmitter section 10 to the second receiver section 40.

The first transmitter section 10 functions in accordance with the so called spectrum spreading technique by direct sequence, in which the useful data 11 to be transmitted modulates the delay of a pseudo-random binary sequence through a voltage controlled oscillator (OCT) 18, this modulation being obtained by variation of the frequency of this oscillator 18. It should be noted that this delay modulation of the code could also be obtained by modifying the delay of the code delivered by the first code generator 17. The second receiver section 40 is a mono-correlator receiver such as is described in French Patent No. 2 612 716, and therefore requires for its operation a pseudo-random binary sequence of the same period T but different from that of the transmitter 10. These two sequences are composed of two half-sequences of equal duration T/2, the first two being identical while the second two have an offset corresponding to one circular rotation, of a duration equal for example to 1 bit (in Principle between 0 and 2 bits). Quite obviously, these half-sequences must have a nil or virtually nil inter-correlation function. The alternating signal 46 has a period T equal to that of the pseudo-random sequences and enables synchronous detection of the correlation function between the received signal (the coded first data signal 14) and an internal signal (the coded second data signal 34), that is to say in fact between the pseudo-random code of the transmitter and that of the receiver, the delay in which may then be synchronized and the code clock (the voltage controlled oscillator 38) controlled. The sequencer 43 only plays a part upon initialization of the link, confining itself to producing a continuous delay ramp over the spreading code, at the position of the control module 38a, when the latter is not synchronized.

In the B to A direction, transmission is effected from the second transmitter section 30 to the first receiver section 20.

The second transmitter section 30 likewise functions in accordance with the spectrum spreading technique by direct sequence, but in this case the useful data 31 to be transmitted frequency modulates the transmission carrier 35. The first receiver section 20 is constituted by a simple mixer 22 followed by a frequency demodulator 25 which restores the useful data. When the period of the spreading code clock is small compared with the period of return propagation between A and B, that is to say for short distances, this return link is considerably simplified since it no longer requires either a specific code generator or oscillator. The use of the first code generator 17 of the transmitter is sufficient to ensure demodulation of the signal with no need for synchronization of the spreading code by a delay locking loop for example.

Figure 3:
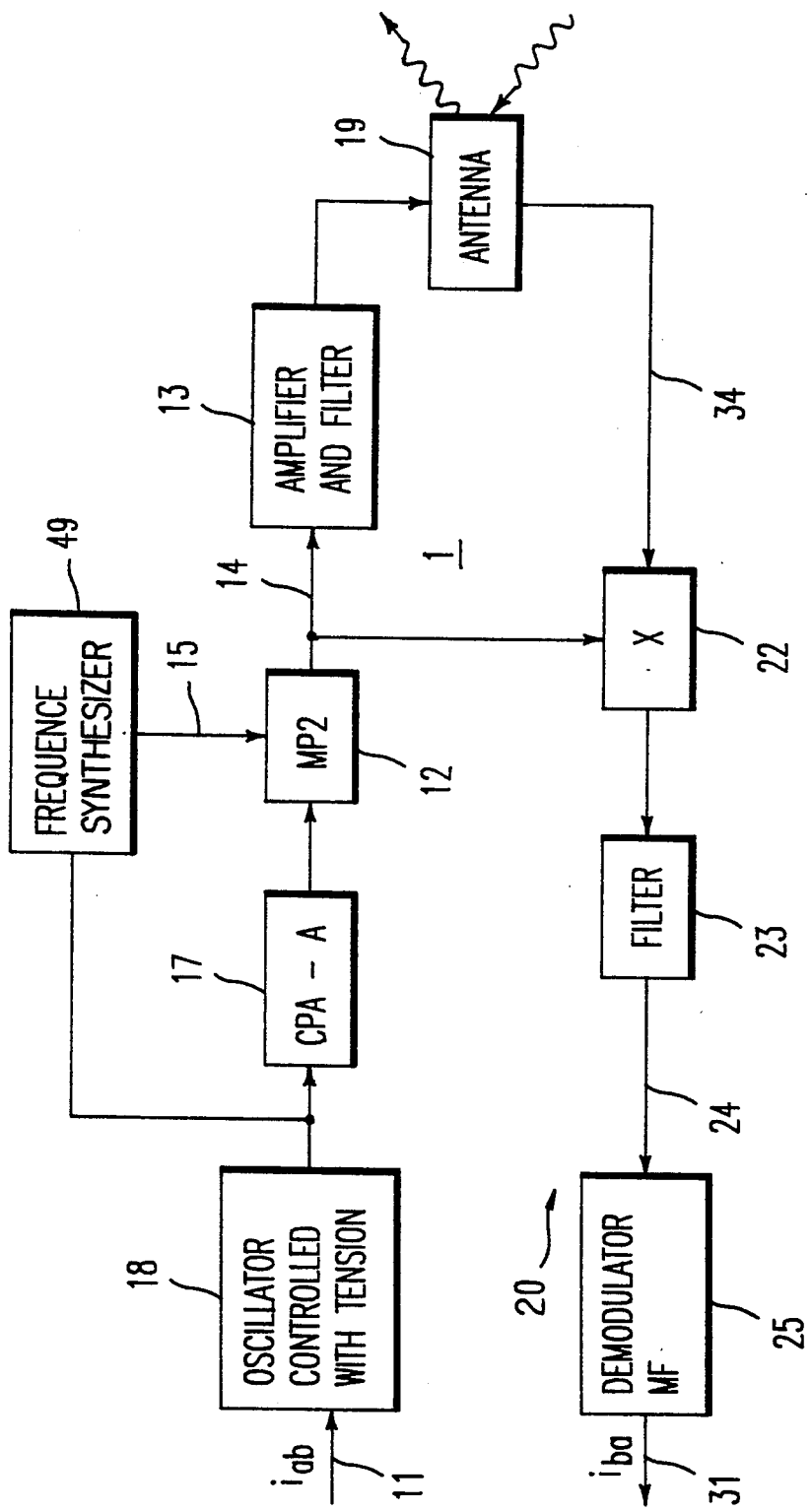
FIG. 3 is a block diagram of a first transmitter-receiver assembly of a second embodiment of the invention.
Figure 4:
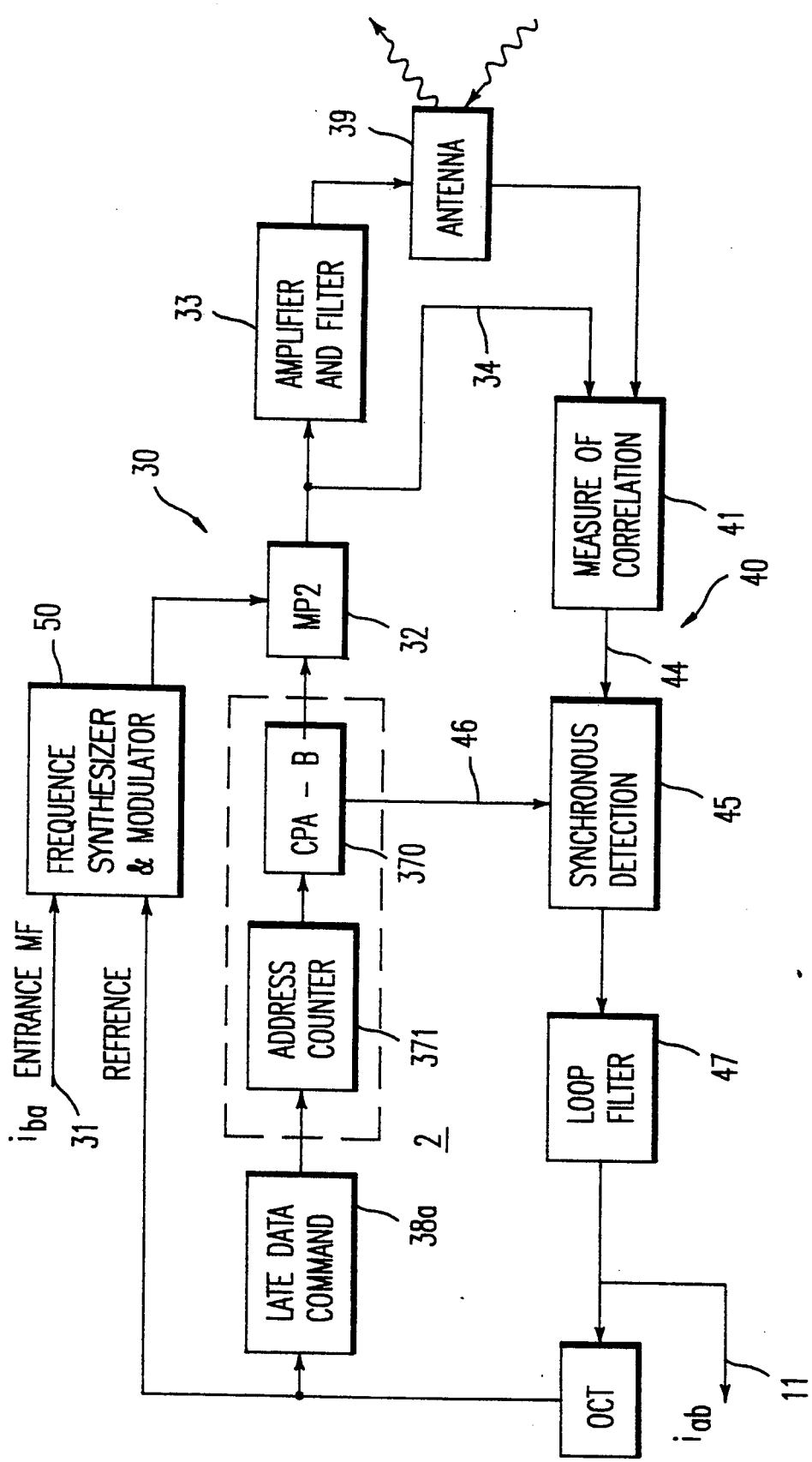
FIG. 4 is a block diagram of a second transmitter-receiver assembly of the second embodiment.

FIGS. 3 and 4 show a second embodiment of the transmission system in accordance with the invention in which the radioelectrical carrier and the spreading clock are produced from a single oscillator.

The elements which constitute this second embodiment are identical to those constituting the first embodiment, with the exception of the assembly for generating the carrier 15 in the first transmitter-receiver assembly 1. In the second embodiment, the carrier is not produced by local oscillator 16 but from the voltage controlled oscillator (VCO) 18, the output signal from which forms the frequency reference via a frequency synthesizer 49. Likewise, in the second transmitter-receiver assembly 2, a second frequency synthesizer 50 replaces the oscillator 36 in order to recreate a frequency modulated carrier so as to be able then to restore the useful data.

Other elements which are unaltered are identified by the same reference numerals as are used in FIGS. 1 and 2.

In the A to B direction, data is transmitted, as before, from the first transmitter section 10 to the second receiver section 40.

The coded first data signal 14 transmitted to the point B is constituted by a carrier which is frequency modulated by the first data 11 (via the synthesizer 49) and spread (with the modulator 12) by the spreading code of the transmitter section 10. The code is produced by the first code generator 17 and is delay modulated by the same input data 11 which is to be transmitted.

The transmitted coded first data signal 14 which is received at the second transmitter-receiver assembly 2 is correlated with the coded data available at the output of the second transmitter section 30 to yield a carrier which is frequency modulated by the second data 31 which is to be transmitted, the amplitude of which is indicative of the correlation between the respective spreading codes of the first and second transmitter-receiver assemblies 1 and 2. Measurement of the delay existing between these two codes, performed at the output of the synchronous detector 45 controlled by the alternating signal 46 will then allow restoration of the first data 11.

The second data 31 which is equally available at the phase or frequency of the received signal 34 is not exploited.

In the B to A direction, the data is transmitted as before, from the second transmitter section 30 to the first receiver section 20.

The coded second data signal 34 transmitted to the point A consists of a carrier which is frequency modulated by the first data 11, the output signal from the voltage controlled oscillator 38 constituting the frequency reference of the second synthesizer 50, and also by the second data 31 which constitutes the modulation input of the said synthesizer 50, and which is spread (by the modulator 32) by the spreading code of the transmitter section 30. This code, which is produced by the second code generator 37 of the second transmitter-receiver assembly 2, is itself delay modulated by the first data 11 restored by the receiver section 40, as previously explained.

The coded second data signal 34 received by the first receiver section 20 is mixed with the coded first data signal 14 available at the output of the first transmitter section 10 to deliver a carrier which is frequency modulated by the second data signal 31. As before, the amplitude of the carrier denotes the correlation between the spreading codes of the two transmitter-receiver assemblies 1 and 2. However, in contrast to the receiver section 40, it is not the amplitude of this carrier which is exploited but its frequency, which is indicative of the second data 31 and for which a simple frequency demodulator 25 is sufficient to restore the data 31.

It should be noted that by virtue of the fact that transmission and reception take place simultaneously, a parasitic transmission will appear at the correlator 41 and the mixer 22 over and above the received signal. However, this parasite due to joint emission may be reduced to a direct current voltage and can then easily be eliminated.

As in the case of the first embodiment shown in FIGS. 1 and 2, a sequencer (not shown) could be added to assist with synchronism at initialization.

FIG. 4 shows an embodiment of the second code generator 37 (equally applicable to the first code generator 17) comprising a memory 370 which contains the spreading code and an address counter 371 which allows this memory to be addressed from the code clock, the latter being constituted by the voltage controlled oscillator 38.

The transmission system in accordance with the invention is particularly useful because it combines the advantages of the spectrum spreading technique by direct sequence, which are discretion, protection against interference or resistance to propagation with multiple paths for example, with those of a conventional bidirectional hertzian link, which opens up infinite possibilities in the field of point-to-point transmission. This may be a link between a computer and a peripheral (one or both of which are mobile), a hertzian link of the RS 232 type or a wireless hertzian modulator-demodulator (modem) inside a building for example.

I claim:

1. A bidirectional data transmission system for transmitting first and second data signals using the technique known as spectrum spreading by direct sequence, comprising first and second transmitter-receiver assemblies,
    said first transmitter-receiver assembly comprising a first transmitter section including an input for said first data, a first code generator for producing a spreading code having a delay modulated under the control of said first data, means for producing a radioelectrical carrier, and a first modulator for modulating said carrier by said spreading code to provide a coded first data signal for transmission, and a first receiver section for receiving a coded second data signal transmitted from said second transmitter receiver assembly and restoring said second data from said received coded second data signal, said first receiver section including a mixer for mixing said received coded second data signal with said coded first data signal, and means for demodulating the output from said mixer to provide said restored second data,
    and said second transmitter-receiver assembly comprising a second transmitter section including an input for said second data, means for producing a transmission carrier modulated by said second data, a second code generator for producing a spreading code having a delay, said second code generator also producing an alternating signal, and a second modulator for modulating said transmission carrier by said spreading code produced by said second code generator to provide said coded second data signal for transmission, and a second receiver section for receiving said coded first data signal transmitted from said first transmitter-receiver assembly and restoring said first data by demodulation of the spreading code delay contained in said coded first data signal, said second receiver section including means for correlating the received coded first data signal with said coded second data signal, and a synchronous detector which receives the output from said correlating means and also said alternating signal to provide said restored first data, said restored first data being used to control said delay of said spreading code produced by said second code generator.

2. A transmission system according to claim 1, wherein said first transmitter section of said first transmitter-receiver assembly includes a voltage controlled oscillator, and the delay modulation of said spreading code produced by said first transmitter-receiver assembly is effected by modification of the frequency of said voltage controlled oscillator under the control of said first data.

3. A transmission system according to claim 1, wherein the delay modulation of said spreading code produced by said first transmitter-receiver assembly is effected by modification of the delay of the code delivered by said first code generator under the control of said first data.

4. A transmission system according to claim 1, wherein the spreading code of said first transmitter-receiver assembly is composed of two alternately used pseudo-random binary semi-sequences of period T/2 and having nil or virtually nil inter-correlation, and the spreading code of said second transmitter-receiver assembly is composed of the same half sequences, one of which is affected by an offset corresponding to a circular rotation.

5. A transmission system according to claim 1, wherein said radioelectrical carrier of said first transmitter-receiver assembly is produced by a fixed frequency local oscillator.

6. A transmission system according to claim 5, wherein said transmission carrier of said second transmitter-receiver assembly is produced by an oscillator of which the frequency can be modified under the control of said second data.

7. A transmission system according to claim 1, wherein said radioelectrical carrier of said first transmitter-receiver assembly is produced by a first frequency synthesizer from a voltage controlled oscillator controlled by said first data.

8. A transmission system according to claim 7, wherein said transmission carrier of said second transmitter-receiver assembly is produced by a second frequency synthesizer from a voltage controlled oscillator controlled by said restored first data, said second frequency synthesizer also receiving said second data as a modulating input.

9. A transmission system according to claim 1, wherein said first and second modulators are of the type having two phase states, for example O-$\pi$.

* * * * *